United States Patent [19]

Lechner

[11] 4,336,424
[45] Jun. 22, 1982

[54] CIRCUIT ARRANGEMENT FOR MONITORING OPERATING CONDITIONS OF DIRECT CURRENT DEVICES

[75] Inventor: Robert Lechner, Otterfing, Fed. Rep. of Germany

[73] Assignee: Siemens Aktiengesellschaft, Berlin & Munich, Fed. Rep. of Germany

[21] Appl. No.: 184,670

[22] Filed: Sep. 8, 1980

[30] Foreign Application Priority Data

Sep. 26, 1979 [DE] Fed. Rep. of Germany ....... 2938946

[51] Int. Cl.$^3$ .............................................. H04M 3/22
[52] U.S. Cl. ............................ 179/18 FG; 179/18 GC
[58] Field of Search ........... 179/18 FG, 18 FA, 18 F, 179/18 FD, 18 FF, 18 G, 18 GB, 18 GC, 18 H, 175.21

[56] References Cited

U.S. PATENT DOCUMENTS 2,238,223 4/1941 Kozma ........................ 179/18 GC
2,755,340 7/1956 Oberman .................... 179/18 GC

FOREIGN PATENT DOCUMENTS 11720 6/1980 European Pat. Off. .
2009686 9/1970 Fed. Rep. of Germany .
2542615 4/1977 Fed. Rep. of Germany .
1481750 8/1977 United Kingdom .

Primary Examiner—Thomas A. Robinson
Attorney, Agent, or Firm—Spellman, Joel and Pelton

[57] ABSTRACT

The circuit arrangement monitors operating conditions of a group of direct current devices. The operating conditions are represented by different potentials occurring at a sampling connector of each direct current device. A first and a second selector unit, each having parallel signal inputs, are arranged symmetrically with respect to commonly connected outputs. Signal inputs of the first selector are connected to corresponding sampling connectors of the DC devices. A control unit for generating a control signal train has an output which is commonly connected to control inputs of both selector units. Commonly grounded filter capacitors are connected to the signal inputs of the second selector unit. A comparator is connected by a first input to a reference voltage source and by a second input to the outputs of both selector units. At the output of the comparator there is delivered a rated output signal evaluating the potential at the presently selected sampling connector with respect to said reference voltage.

6 Claims, 1 Drawing Figure

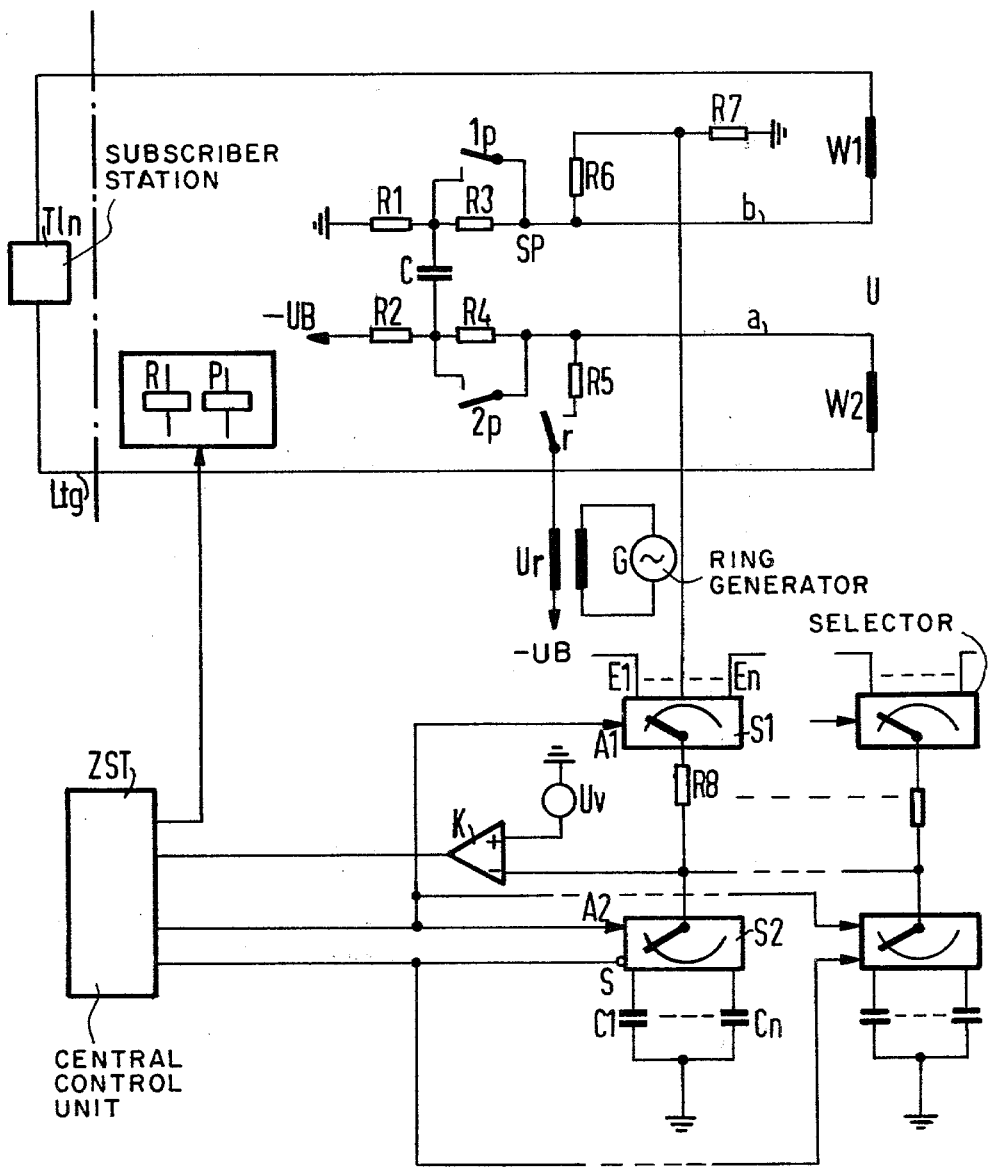

CIRCUIT ARRANGEMENT FOR MONITORING OPERATING CONDITIONS OF DIRECT CURRENT DEVICES

BACKGROUND OF THE INVENTION

The invention is related to a circuit arrangement for monitoring operating conditions of a group of direct current devices, wherein the operating conditions are represented by different potentials occurring at a sampling connector of each direct current device.

More specifically the invention is directed to such a circuit arrangement wherein the direct current devices to be monitored comprise subscriber line loops composed of a subscriber station, a subscriber line and a subscriber interface circuit of a telephone exchange system.

There is provided an evaluating unit associated with a plurality of direct current devices which unit can be selectively through-connected to a sampling point of each direct current device. The evaluating unit has to sample specific voltage conditions and corresponding operating conditions of a DC device. For this reason AC voltage components, which may occur at the sampling connector have to be separated in order to avoid a false measurement. As mentioned, a subscriber line loop can be one application for such a direct current device. In such a case, the different operating conditions correspond to open-loop or closed-loop conditions of the subscriber line loop. By monitoring these conditions, switching signals can be recognized for controlling functions and operations of the PBX. One example of such signals are dial tone signals. If each subscriber line interface circuit also employs an exchange supply fed into the circuit via supply resistors, the sampling connector may be a connecting point of one wire of the subscriber line which is connected to the supply resistor not directly coupled to the plus pole of the supply voltage.

Noise or interfering voltages composed of AC voltage components may occur at such a sampling connector and which result from inductive coupling of the subscriber line to other electrical lines, like power mains. Such AC voltage components, however, may also be useful signals, as for example the ring AC voltage. In any event, it has to be guaranteed that the evaluating unit influenced by such AC voltage components may not be disturbed such that an evaluating signal is delivered which does not correspond to the present operating condition of the sampled direct current device.

It is, therefore, an object of the present invention to improve known circuit arrangements for monitoring operating conditions in such a manner that critical sampling conditions are effectively excluded.

Another object of the invention is to improve the design of the circuit arrangement in such a manner that it can be assembled in a space-saving arrangement which also is suited for a design in an integrated circuit technology.

SUMMARY OF THE INVENTION

There is disclosed a circuit arrangement for monitoring operating conditions of a group of direct current devices wherein the operating conditions are represented by different potentials occurring at a sampling connector of each direct current device. There is provided a first and a second selector unit, each having parallel inputs, an output and a control input for receiving a control signal causing a step-by-step action of the respective selector unit. The selector units are arranged symmetrically with respect to their commonly connected outputs. Each of the information inputs of the first selector is connected to a respective sampling connector of one of the direct current devices. Furthermore, there are presented means for generating a control signal train supplied by an output to the commonly connected control inputs of both selector units. A plurality of filter capacitors commonly connected to ground, are arranged in parallel, such that each capacitor is connected to a respective one of the signal inputs of the second selector unit. A voltage source for generating a reference voltage with respect to the potentials occurring at the sampling connectors is connected to a first input of a comparator which second input is coupled to the commonly connected outputs of the selector units. At an output of the comparator a rated output signal evaluating the potential at the presently selected sampling connector with respect to the reference voltage is delivered.

The circuit arrangement according to the present invention is especially advantageous because of the design of the filter arrangement composed of the second selector unit and the filter capacitors connected in parallel to the inputs of that second selector unit and including the effective resistance of the input circuit of the comparator. This design means that during a monitoring cycle in each of the consecutive monitoring intervals just one filter section is active, i.e. one filter capacitor is charged. During the rest of the monitoring cycle, a previously activated capacitor not being coupled to the active selector output will be discharged totally during a long time span. This circuit design allows in comparison to a fixedly coupled filter capacitor that the values of n filter capacitors can be chosen to be smaller. The filter capacitors being actuated in a time-multiplex operation may have reduced values of 1/n-th of the value of a fixedly connected capacitor.

This is true with the understanding that the frequency of interfering AC voltages superposing a useful DC signal is smaller than the cycle frequency of the monitoring cycle composed of n monitoring intervals. The monitoring cycle then determines the time span after which the same sampling connector will be sampled a second time; which means automatically that the corresponding filter capacitor also is selected a second time. The values of the filter capacitors can be further reduced if the capacitors, in fact, are through-connected to the output of the second selector unit just during a fractional part of the corresponding monitoring interval. In this manner, without depreciation of the filter characteristic, filter sections can be composed of filter capacitors having very small capacitances.

Thus, it is possible to implement filter sections which can be directly integrated into an integrated circuit instead of composing the filter capacitors of discrete components. This is true with the understanding that such a reduced value of a filter capacitor still has to be larger than the input capacitance of a selector unit also forming part of a common integrated circuit including both selector units and the comparator in the manner of conventional multiplexors and comparators, respectively, with known layout.

If a filter capacitor is selected once during a monitoring cycle, there is automatically defined a time span which can be designated as "virtual" time constant which has, in view of the desired filter characteristic, at least the same effect as in using a conventional, directly connected filter capacitor having a capacitance of n-fold value. The maximum value of the effective resistance in the input circuit of the comparator is determined by the electrical input characteristics of the used comparator. These characteristics may require to insert an individual resistor into this input circuit, for example, at the output side of the first selector. Such an ohmic resistor, above all, forms the resistor component of the RC circuit, a filter section and its value is determined by the acceptable off-set failure of the comparator.

The circuit design is most useful if the operating conditions of the direct current device to be monitored can be associated with one of two groups, wherein a change from a condition of one group to a condition of the other group is indicated by a step function. Thus the comparator can be designed in such a manner that the actual signal can be evaluated by a predetermined threshold level. The comparator then determines if the potential at the monitored sampling connector presently represents a voltage above or beneath this threshold level.

The circuit arrangement according to the present invention is especially advantageous in an application wherein the direct current devices comprise subscriber line loops of a telephone exchange system, such loops being composed of a subscriber station, a subscriber line and a subscriber line interface circuit.

BRIEF DESCRIPTION OF THE DRAWING

A better understanding of the invention may be had by reference to the following description of a preferred embodiment in conjunction with the accompanying drawing. The single figure shows a circuit arrangement for monitoring operating conditions of a DC device avoiding distorting interference of AC voltages superposing the useful AC signal.

DESCRIPTION OF THE PREFERRED EMBODIMENT

A preferred embodiment of the invention which will now be described represents a subscriber line loop of a telephone exchange system as one example of a DC device which operating conditions are to be monitored and evaluated.

A subscriber station Tln is connected by the two wires of an extension line Ltg to primary windings w1, w2 of a hybrid circuit U which are, in turn, coupled to a supply circuit. The supply circuit forms a part of a subscriber line interface circuit of a private branch exchange being associated with each subscriber line. This subscriber line loop can be opened or closed by an operator actuating a hook switch of the subscriber station. The supply circuit for a low-resistance supply comprises two supply resistors R1, R2. The first supply resistor R1 is arranged in the R-wire b of the extension line which wire is connected to ground; the second supply resistor R2 forms a part of the A-wire a connected to the negative pole of the supply battery -UB. In the circuit of both wires further resistors R3 and R4, respectively, can be inserted. Both resistors R3 and R4 can be short-circuited separately be relay contacts 1p and 2p, respectively arranged in parallel to the associated resistor. It is the purpose of the inserted resistors R3 and R4 to offer a high-resistance voltage supply. The high-resistance supply condition may be chosen for a free-circuit condition. At a time when low-resistance supply is necessary resistors R3 and R4 will be short-circuited by closing relay contacts 1p and 2p. This can be performed when after hook-off of the handset of the subscriber station a closed-loop condition is recognized. Assuming a low-resistance supply during busy condition of the subscriber station nevertheless the supply circuit can be switched into its high resistance condition. This can apply for a critical condition occurring by an excessive load of the supply circuit which can be recognized by a monitoring circuit. In this case, the supply current can be reduced as far as to avoid such excessive load.

Also individual ringing signal supply to a subscriber station is performed by central parts of the private branch exchange. A central ring generator G generating an AC voltage of signalling frequency is coupled by a ring signal transformer Ur to the subscriber line. The secondary winding of this transformer is connected to the negative pole of the DC supply voltage UB on the one hand, and via a closed relay contact r and a further resistor R5 to the A-wire a of the subscriber line Ltg, on the other hand. The ring signal is composed of a DC voltage superposed by an AC voltage. At the time of feeding the ring signal the relay contact 2p should be opened. This means that the signalling current cannot be distorted by the supply current flowing through supply resistors and also cannot flow off across a capacitor C inserted between the connector tap of resistors R1 and R3 in the R-wire b, on the one hand, and the connector tap of resistors R2 and R4 of the A-wire a, on the other hand, since it is assumed that resistors R3 and R4 are of high resistance.

Relay contacts r, 1p and 2p are controlled by a conventional relay control associated with relays R and P related to the respective relay contacts. Control signals for each relay pair P and R associated with a subscriber line interface circuit are supplied in a conventional manner by a central control unit ZST, as indicated in the drawing.

It may be mentioned that in the drawing just the connections of the hybrid circuit U to the supply circuit and to the subscriber station Tln are shown. The four-wire side of the hybrid circuit forming the interface between the two-wire subscriber line and four-wire transmission line is not shown since such hybrid circuits are well known in the art and connections to the four-wire transmission line and operations on the transmission line form no part of the present invention.

For this embodiment the condition of the potential at a sampling connector, the connector tap SP connecting the high-resistance supply resistor R3 to the R-wire b shall be monitored and evaluated. For performing the monitoring operation, there is provided a selector unit S1 which may be designed as a conventional multiplexer having parallel signal inputs E1 through En. Each of these inputs is related to an individual subscriber line interface, i.e. a different subscriber station. The simplified drawing shows just one interface. The selector unit S1 can be consecutively set into one out of n selecting conditions wherein in each of these conditions a respective one of the sampling connectors SP of the associated group of subscriber line interface circuits is selected for monitoring. Sampling connector SP is not directly connected to a respective input of selector unit S1. A voltage divider composed of further resistors R6 and R7 is inserted between the sampling connector SP and ground. The connector tap between the resistors R6 and R7 forms the actual connecting point to the respective input of the selector unit S1. It is the purpose of this voltage divider to rate voltages arising at sampling connector SP to an applicable reduced level in accordance with given electrical characteristics of the chosen selector unit S1, which may be designed as part of an integrated circuit.

The different signals supplied by the different subscriber line interface circuits, i.e. the potentials at sampling points SP are selectively switched through the selector unit S1. This is established by feeding control signals to a select input A1 of selector unit S1. It may be mentioned that such control signals may comprise as well a clock pulse train as binary coded addresses across parallel lines dependent upon the implementation of the selector. By consecutively incrementing such an address subsequent inputs can be selected for through-connection, for example.

As soon as the last sampling connector SP of a group of n subscriber line interface circuits has been monitored by selecting the highest signal input En of selector unit S1, the cycle can be continued in parallel groups of subscriber line interface circuits under control of further selector units arranged in parallel to the first selector unit S1, described, as indicated in the drawing. The parallel arrangement applies as well to commonly connected outputs as to address inputs A1 which are commonly connected to address outputs of the central control unit ZST. In such a manner a plurality of groups of subscriber line interface circuits can be monitored one after another. Having performed a complete monitoring cycle an individual sampling connector SP of the first group can be selected a second time. The timely sequence of monitoring operations for an individual sampling connector SP has to be chosen such that even the fastest change of a circuit condition can be monitored accurately.

The monitoring operation described still has one restraint. Dependent upon the operating condition of a subscriber line different potentials occur at supply resistors, i.e. the supply resistor R1 or the series connection of resistors R1 and R3. Such changes enable to monitor signals, as for example dialing pulses of a subscriber station by evaluating the respective potentials at the sampling connector SP. For evaluating potentials at the sampling connector SP there is provided a comparator K connected by one input to the output of selector unit S1 via a further resistor R8. A second input of comparator K is supplied by a reference voltage Uv. This voltage is chosen such that, by way of an example, potential ranges of open-loop conditions and closed-loop conditions of the subscriber line can be separated. The states of an output signal of comparator K thus will be different dependent upon the value of the measuring voltage which is fed to the comparator via the selector unit S1. The output signal of comparator K may correspond to logic level "1" characterizing a measuring voltage associated with a closed-loop condition. Under this condition a monitoring result at the output of comparator K representing a logic level "0" indicates an open-loop condition. Output signals of comparator K in the present embodiment are supplied to the central control unit ZST which initiates in a conventional manner known procedures for establishing a call connection or a call release, for example. Such procedures in themselves are not part of the present invention and are well known in the art of PBX's or PABX's, thus further detailed description is not deemed to be necessary.

Measures have to be taken that undesired AC voltage components occurring at sampling connector SP may not affect evaluation of useful signals in such a manner that the operation of comparator K leads to falsified results. Such AC voltage components can result from interfering voltages induced into a subscriber line, e.g. from an adjacent power main. It also may be that ringing AC voltage superposes the DC supply voltage. It has to be reassured that the ringing AC voltage component by itself cannot result in an output signal of comparator K which corresponds to a true result exclusively associated with a closed-loop condition.

An especially critical situation with respect to interfering AC voltages occurs during the high-resistance supply condition of a subscriber line as described. To exclude definitely a disadvantageous measuring result there is provided a filter arrangement. Symmetrically to selector unit S1 there is arranged a second selector unit S2 connected by its output to a connector tap between resistor R8 and the inverting measuring input of comparator K. Each of the inputs of selector unit S2 is connected to a respective one of filter capacitors C1 through Cn which, in turn, are commonly connected to ground. The circuit arrangement is such that by synchronous addressing of both selector units S1 and S2 each of these filter capacitors is assigned to a respective subscriber line interface circuit or sampling connector SP. A selected filter capacitor and the common resistor R8 form a filter section having high-pass characteristics with respect to the ground connection for by-passing AC voltage components.

The essential feature of this filter arrangement is that the capacitor is not constantly coupled to the input circuit of the evaluating device. Being selected by the second selector unit S2 each of the capacitors C1 to Cn can be active, at most, during a time span determined by the corresponding monitoring operation for one subscriber line. The same capacitor will be charged again not till a whole monitoring cycle has been completed and the same subscriber line is monitored again. With the understanding that the frequency of the AC voltage component is smaller than the cycle frequency, the capacitance of a filter capacitor may be much smaller as if a single capacitor was directly connected to the input circuit of the evaluating device and thus being constantly effective.

As assumed, the selector units S1 and S2 have n monitoring states, accordingly, the capacitance of filter capacitors C1 to Cn can be at least n times smaller than a directly connected filter capacitor. The filtering characteristic is not affected by such a design. The filtering effect is dependent upon an effective time constant which can be designated as a virtual time constant in contrast to an actual time constant of a directly connected filter capacitor. The maximum value for resistor R8 commonly coupled to all filter capacitors C1 to Cn is determined by given input conditions of comparator K based upon its electrical characteristics. Therefore, the filter capacitor is the main component for determining the virtual time constant, wherein the ratio of the virtual time constant to the actual time constant equals the ratio of the time for a monitoring cycle to one monitoring interval within that cycle. Correspondingly, the filter capacitors can be designed at least as small as to match this ratio inherent to the circuit design.

The values of filter capacitors C1 through Cn can be even smaller without any influence on the filter characteristic if the effective time span, i.e. the time span for charging the capacitor is only a fractional part of the monitoring interval, which operation characteristic would even enlarge the mentioned ratio.

This design structure offers a possibility for integrating filter capacitors directly into the circuit instead of composing filter sections of discrete capacitors. This is true with the understanding that the effective capacitance of a filter capacitor in such a case still has to be higher than the input capacitance of the selector unit also integrated into a common integrated circuit.

The synchronous operation of both selector units S1 and S2 is determined by common addressing with selector addresses furnished by the central control unit ZST. Address control inputs of selector units S1 and S2 are indicated by A1 and A2, respectively. The central control unit ZST also can be used to supply an enabling signal to a further control input S of the second selector unit S2 effecting an actual through-connection of the second selector unit S2 from the connector tap of resistor R8 to a selected filter capacitor only during a time span which is a fractional part of a monitoring interval.

There has thus been shown and described a novel circuit arrangement for evaluating operating conditions of a direct current device which fulfills all the objects and advantages sought therefor. Many changes, modifications, variations and other uses and applications of the subject invention will, however, become apparent to those skilled in the art after considering this specification and the accompanying drawing which discloses preferred embodiments. All such changes, modifications, variations and other uses and applications which do not depart from the spirit and scope of the invention are deemed to be covered by the invention which is limited only by the claims which follow.

What is claimed is:

1. A circuit arrangement for monitoring operating conditions of a group of direct current devices, said operating conditions represented by different potentials occurring at a sampling connector of each direct current device, said circuit arrangement comprising:
   (a) a first and a second selector unit, each having parallel signal inputs, an output and a control input for receiving a control signal causing step-by-step action of the respective selector unit, the outputs of said selector units being connected, and each of said signal inputs of said first selector being connected to a respective sampling connector of one of said direct current devices;
   (b) means for generating a control signal train and having an output commonly connected to said control inputs of both selector units;
   (c) a plurality of filter capacitors arranged in parallel with respect to each other and being commonly connected to ground, each of said capacitors being connected to a respective one of said signal inputs of the second selector unit;
   (d) a voltage source for generating a reference voltage with respect to said potentials at said sampling connectors; and
   (e) a comparator having a first input connected to said reference voltage source, a second input connected to said outputs of said selector units and an output for delivering a binary output signal evaluating the potential at the presently selected sampling connector with respect to said reference voltage.

2. The circuit arrangement as recited in claim 1, wherein:
   (a1) said second selector unit has a second control input for receiving a strobe signal enabling a timely limited through-connection from a presently selected signal input to said output of said selector unit during the active state of said strobe signal; and
   (b1) said means for generating a control signal train is also operative to generate a strobe signal train which is identical to said control signal train except for a shorter pulse duration and has a further output connected to said second control input of said selector unit.

3. The circuit arrangement as recited in claim 1, further comprising a resistor inserted between the outputs of the selector units.

4. The circuit arrangement as recited in claim 1, comprising a plurality of pairs of first and second selector units, said pairs being arranged in parallel with respect to the commonly connected outputs and being consecutively selected for monitoring operations by said means for generating a control signal train.

5. The circuit arrangement as recited in claim 1, wherein the first selector unit, the second selector unit, the filter capacitors, the common output resistor and the comparator are commonly assembled into one integrated circuit.

6. The circuit arrangement as recited in claim 1, wherein the direct current devices comprise subscriber line loops composed of a subscriber station, a subscriber line and a subscriber line interface circuit.

* * * * *